United States Patent [19]

Snyder et al.

[11] Patent Number: 5,111,897
[45] Date of Patent: May 12, 1992

[54] BRIDGE WEIGH-IN-MOTION SYSTEM

[75] Inventors: Richard E. Snyder, Russell; Fred Moses, Cleveland Hts.; Bryan E. Burke, Cleveland Hts.; Dean A. Kennedy, Cleveland Hts., all of Ohio

[73] Assignee: Bridge Weighing Systems, Inc., Cleveland, Ohio

[21] Appl. No.: 589,468

[22] Filed: Sep. 27, 1990

[51] Int. Cl.$^5$ ............................................. G01G 19/52
[52] U.S. Cl. ......................................... 177/132; 177/1; 177/4; 177/12; 177/25.13; 177/163; 364/567; 73/786
[58] Field of Search ................ 177/1, 4, 12, 25.11, 177/25.13, 25.14, 132, 133, 134, 163; 364/567; 73/786

[56] References Cited

U.S. PATENT DOCUMENTS

| 3,734,216 | 5/1973 | Nordstrome et al. | 177/163 X |
| 3,825,734 | 7/1974 | Jacobs et al. | 177/25.14 X |
| 4,416,342 | 11/1983 | Snead | 177/163 |
| 4,539,650 | 9/1985 | Griffin et al. | 364/567 |
| 4,560,016 | 12/1985 | Ibanez et al. | 177/210 |
| 4,649,490 | 3/1987 | Manduley et al. | 177/25.13 X |
| 4,657,096 | 4/1987 | Angelbeck | 177/163 |
| 4,667,757 | 5/1987 | Johnson | 177/1 |
| 4,712,423 | 12/1987 | Siffert et al. | 177/132 |
| 4,763,739 | 8/1988 | Kasinoff | 177/1 X |
| 4,901,575 | 2/1990 | Bohannan | 73/587 |

OTHER PUBLICATIONS

Kriss, "Weigh-In-Motion Prediction Method", Dept. of Civil Engineering, Case Western Reserve University, Jan. 1979, pp. 11-20.
Moses Snyder "Pavement Management, Data Storage, Surface Properties, and Weigh-In-Motion", Transportation Research Record 1048, pp. 82-88, 1985.
Moses, "Weigh-In-Motion System Using Instrumented Bridges", Transportation Engineering Journal, May 1979.
Snyder, Likins, Jr., & Moses, "Loading Spectrum Experienced by Bridge Structures in The United States", U.S. D.O.T. Final Report, Feb., 1985, pp. 1-28.

Primary Examiner—Benjamin R. Fuller
Assistant Examiner—Randy Gibson
Attorney, Agent, or Firm—Calfee, Halter & Griswold

[57] ABSTRACT

An apparatus and method are provided for calculating the speed and weight of a vehicle as it passes over an existing bridge. The apparatus includes a number of strain gages attachable to existing bridge girders or support members each of which outputs an analog strain signal in response to strain sustained by the bridge when a vehicle passes thereover. An analog front end circuit card amplifies the analog strain signal and converts it into digital format. A pair of axle sensors installed in or on the pavement before the bridge each output an axle sense signal in response to a vehicle axle passing thereover. A central processing unit receives the axle sense signals and the digitally formatted strain signals and performs calculations necessary to determine vehicle speed and weight. A static random access memory card is used to retain the results of these calculations for retrieval at a later time. A power supply provides electrical power to the system components. The method comprises the steps of providing axle sense signals generated by a pair of axle sensors in response to a vehicle passing thereover, providing an analog strain signal generated by a strain gage attached to a bridge structure, converting the analog strain signal to digital format, determining the vehicle speed and axle spacings, relating the position of every axle on the bridge to the strain record, and calculating axle weights using a least squares error minimization algorithm.

26 Claims, 9 Drawing Sheets

BRIDGE WEIGH-IN-MOTION SYSTEM

The invention as defined by claims 1, 2, 3, 4, 5, and 6 was made with U.S. Government support and the Government has certain rights in the invention as defined by those claims.

TECHNICAL FIELD

The invention relates to an apparatus and method for weighing a moving vehicle, and more specifically, to an apparatus and method for calculating the weight of a vehicle as it passes over a bridge.

BACKGROUND OF THE INVENTION

The availability of truck weight, dimension, classification and speed data is required for highway engineers in determining the structural and maintenance requirements of pavements and bridges. Accurate data of these types is also necessary for planning, economic and enforcement surveys.

Devices and methods for collecting these data are known to exist in both permanent and portable form. Most truck weight data is presently collected by static weigh stations operating at fixed locations on major highways. Fixed weigh stations, however, are costly and often ineffective due to scale avoidance and the limited amount of data collected at specific sites. Although a portable method of weighing a vehicle in motion is known, the method has not been widely implemented, due to the high cost of equipment and the need for well-trained operators of such equipment. Moreover, because operations are present at the weighing location, the operators are exposed to road hazards, and scale avoidance remains a problem.

A method of weighing a moving vehicle is suggested by Moses and Garson in "Probability Theory for Highway Bridge Fatigue Stresses", Report No. SMSMD No. 50 to Department of Transportation, Columbus, Ohio, July 1973. The report notes the correlation of peak strains sustained by bridge structures to gross vehicle weight of trucks passing over the structure. Measuring only the peak strains, however, does not provide sufficient information for estimating axle weights and gross weights of vehicles of all configurations.

Moses later disclosed a method for weighing a moving vehicle that used a least squares error minimization technique to calculate the individual vehicle axle weights, in "Weigh-in-Motion System Using Instrumented Bridges", Transportation Engineering Journal, ASCE, Vol. 105, May 1979. Inputs to the algorithm used in this technique are the entire strain record of the bridge structure as the vehicle crosses, and a function relating the position of each axle with time. This method of weighing a moving vehicle has had limited success, however, due to costly computing equipment and the functional limits imposed by using such equipment. In addition, the continued presence of operators at the weighing site is required.

Thus, there is a need for a portable, low-cost apparatus and method of weighing a vehicle in motion, using existing bridge structures, which can be operated unattended at an extended temperature range for extended periods of time. The present invention addresses this need.

SUMMARY OF THE INVENTION

According to the present invention, a system comprising an undetectable and unattended apparatus and a method of acquiring vehicle speed, weight and classification information is provided. The apparatus comprises a number of strain gages attached to existing bridge girders, a pair of axle sensors, means to condition the output of the strain gages, a central processing unit which receives the axle sensor outputs and the conditioned strain gage outputs to determine vehicle speed and weight, and random access memory circuitry adapted to receive and retain the speed and weight determinations. The method of weighing comprises the use of a software program with the central processing unit which implements a least squares error minimization technique to determine the vehicle speed, weight and classification.

The apparatus uses existing bridges as a scale. Strain gages are attached to a number of bridge girders or members. As a vehicle crosses the bridge, the girders or members sustain a strain which is related to the deflection of the bridge. The strain gages measure the strain and output an analog strain signal in response to the strain.

An analog front end card provides signal conditioning for the strain gages. Each analog strain signal is amplified and then converted to a digital strain signal by an on-board analog to digital converter. Each analog front end card can accommodate up to eight analog strain signal inputs, and more than one analog front-end card can be used in the apparatus.

A pair of axle sensors such as tape switches, piezoelectric sensors, or road hoses are placed on or installed in the pavement just before the bridge. Each axle sensor can sense a vehicle axle passing thereover and output an axle sense signal in response thereto. The axle sense signals are used by the central processing unit for calculating the vehicle speed and axle spacings.

In addition to providing an axle sense signal used in speed and axle spacing calculations, the first axle sensor can be used to implement a system power saving feature. Various system components on the analog front end card and the central processing circuit card are deactivated when not required by the system to collect or process axle sense or strain data. The axle sense signal outputted by the first axle sensor alerts the system of the next approaching vehicle to permit reactivation of these inactive system components. Before the vehicle reaches the bridge, the system is enabled to collect and process the data required to perform the weighing calculations. The axle sense signals outputted by both axle sensors are used as a factor in these calculations.

A central processing circuit card utilizes a software-driven microprocessor to perform the calculations necessary to determine the vehicle speed, weight and classification. Additionally, the central processing unit has erasable-programmable read only memory (EPROM) capability into which the system software is permanently written. The system software consists of an acquire program and a process program. The acquire program collects the input data which comprises the axle sense signals outputted by the axle sensors and the digital strain signals outputted by the analog front end circuit card. The acquire program also calculates the speed of a vehicle using this data. The process program determines the vehicle weight and classification. Speed, weight, and classification data are stored in memory for retrieval at a later time.

Mass storage of data is provided by a mass static random access memory (MSRAM) card. Once data is written to MSRAM it will be retained indefinitely as long as power is provided to the chips. Each MSRAM card has two lithium cell batteries on board to provide the power necessary to retain the data for at least five years. More than one MSRAM card can be used in the apparatus to enhance data storage capability.

The apparatus also includes a power supply in the form of a battery or solar cell or a combination thereof. The power supply provides the electrical power necessary to operate the system components. Additionally, the apparatus includes electrical interconnection means in the form of a back plane which provides point-to-point wiring between printed circuit cards and carries the system signals and power. The back plane permits communication between the cards installed in any order within the back plane.

The invention also provides a method of acquiring vehicle speed, weight and classification data. The method comprises the steps of providing an axle sense signal generated by an axle sensor in response to a vehicle passing thereover, providing an analog strain signal generated by a strain gage attached to a bridge structure, converting the analog strain signal to digital format, determining the vehicle speed and axle spacings, relating the position of every axle on the bridge to the strain record of the bridge structure, and calculating axle weights using a least squares error minimization technique. The vehicle speed, weight and classification data are then recorded for later retrieval.

Thus, it is an object of the present invention to provide a system comprising an apparatus and method for determining the speed, weight and classification data of a vehicle passing over an existing bridge. It is a further object of the invention to provide a low-cost, compact and easy to install portable system for accurately determining this data. It is still a further object of the invention to provide a portable or permanent system which can operate unattended, for extended periods of time within an extended temperature range, and retain data for later retrieval.

DETAILED DESCRIPTION OF THE PREFERRED EMBODIMENT

Figure 1:
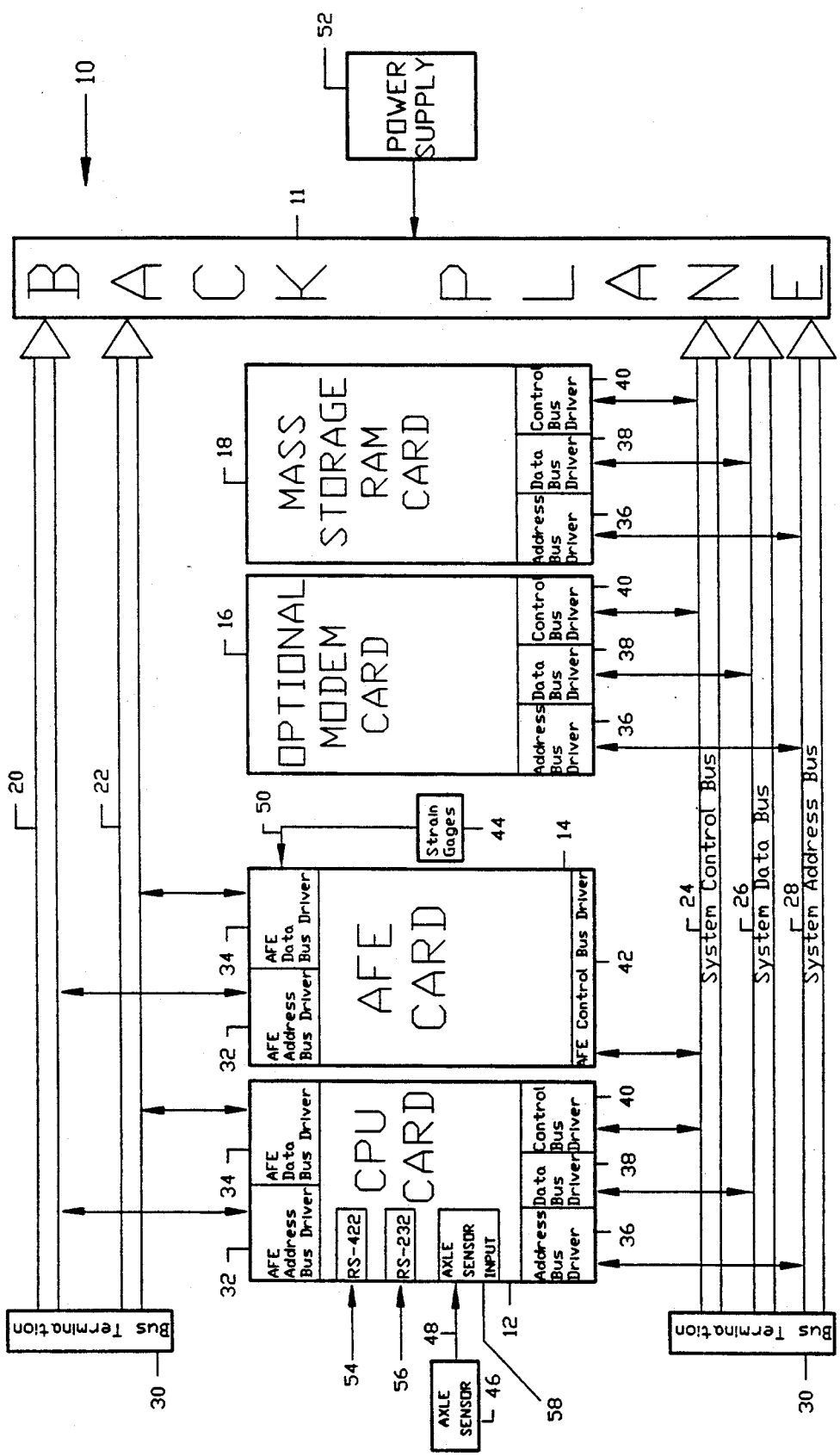
FIG. 1 is a block diagram of the weigh-in-motion system according to the present invention.

Referring now to the drawings, a vehicle weigh-in-motion system according to the present invention is shown. The system includes both an apparatus and a method for weighing a vehicle as it crosses over an existing bridge.

FIG. 1 shows a block diagram of the vehicle weigh-in-motion apparatus 10. The apparatus includes a back plane 11 which electrically interconnects the printed circuit cards used in the apparatus. An electrical power supply 52 supplies electrical power to the back plane. The back plane 11 transmits the power to the printed circuit cards used in the apparatus. The printed circuit cards include a central processing unit (CPU) card 12, an analog front end (AFE) card 14, a mass storage random access memory (MSRAM) card 18, and an optional modem card 16. The CPU, AFE, and MSRAM circuit cards are connected to the back plane by means of electrical connectors on the back plane which permit easy installation or removal of the cards. The CPU, AFE, and MSRAM cards can be installed in any order in the back plane. The apparatus 10 also includes a pair of axle sensors 46 capable of outputting axle sense signals 48 to the CPU axle sensor input port 58, and strain gages 44 which output analog strain signals to the AFE card 14.

The CPU card 12, the AFE card 14, the MSRAM card 18 and the optional modem card 16 electrically interconnect by means of the back plane and communicate with each other be means of the system control bus 24, system data bus 26, and system address bus 28. The buses 24, 26 and 28 terminate at a bus termination 30. The bus termination 30 allows the bus to operate at high speed and with low power consumption. Address bus drivers 36, data bus drivers 38, and control bus drivers 40 are located on the CPU card 12, the MSRAM card 18, and the optional modem card 16. AFE address bus drivers 32 and AFE data bus drivers 34 are located on the CPU card 12 and the AFE card 14. AFE control bus driver 42 is located on the AFE card 14.

All of these system bus drivers 32, 34, 36, 38, 40, and 42 serve two functions. First, the bus drivers act as a buffer between the respective cards and buses to prevent damage to a card's internal circuitry. If a short, a power surge, or other inappropriate signal appears on any of the buses, the bus driver will fail and prevent the signal from damaging any internal components on the cards. Second, the bus driver can sink or source electrical current, thereby providing the apparatus with the capability to handle additional printed circuit cards. A signal conditioning address bus 20 and a signal conditioning data bus 22 allow the CPU card 12 and the AFE card 14 to communicate with each other.

The apparatus 10 uses existing bridges as a scale. A pair of axle sensors 46 are placed on each lane of a roadway before the bridge. Each axle sensor outputs an axle sense signal 48 to the CPU card when a vehicle passes over the sensor. The axle sense signals and the times at which each signal is generated are used by the CPU card to calculate the vehicle speed and axle spacings. A number of strain gages 44 are mounted on the existing bridge support members. The strain gages output analog strain signals 50 to the AFE card 14 in response to strains sustained by the bridge support member when a vehicle passes over the bridge. The AFE card 14 converts the analog strain signal 50 to a digital signal which is passed on to the CPU card 12. The CPU card and the AFE card communicate with each other over the signal conditioning address bus 20 and data bus 22. The buses 20 and 22 are isolated from the system control, data, and address buses, and terminate at the bus termination 30.

The CPU card 12 performs the calculations necessary to determine the vehicle speed and weight. The results of these calculations are sent to the MSRAM card 18. The MSRAM card stores this data for retrieval at a later time. If the optional modem card 16 is installed into the back plane 12, this data can be accessed directly over an ordinary telephone line, eliminating the need for a third party modem.

Figure 2:
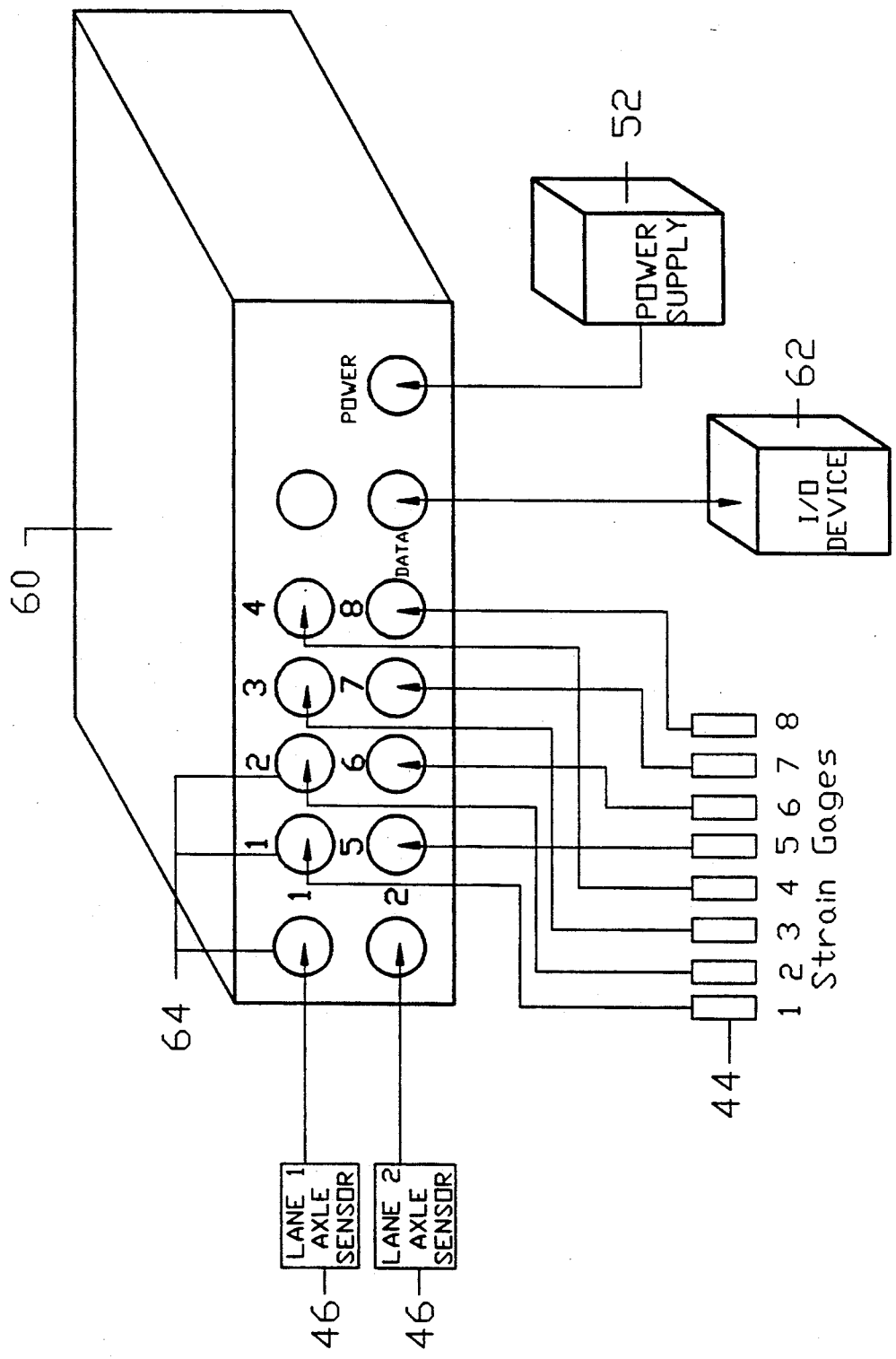
FIG. 2 is a diagram of the weigh-in-motion system interconnections.

FIG. 2 shows the electrical interconnection scheme for the various system components. All system components are designed to have a temperature operational range of −40° C. to 70° C. (−40° F. to 158° F.). An enclosure 60 is provided to protect the system printed circuit cards and back plane from the environment. In the permanent or portable system arrangements, the axle sensors 46 and the strain gages 44 are located outside the enclosure 60 and must, therefore, have their own durable enclosure to withstand the environmental elements. The power supply 52 may be contained either within or outside the enclosure 60. The enclosure 60 provides convenient electrical interconnection points 64 for the axle sensors, the strain gages, the power supply, and an input/output device 62 such as a lap-top computer. The input/output device is used to communicate with the CPU card to retrieve data. When used in a portable mode, there is no need to open the enclosure 60 to make any of the interconnections.

A pair of axle sensors 46 are electrically connected to the interconnection points 64 on the enclosure 60. In addition to outputting signals required for speed and weight calculations, one of the sensors 46 permits the system power saving feature to be implemented as described below.

Figure 7:
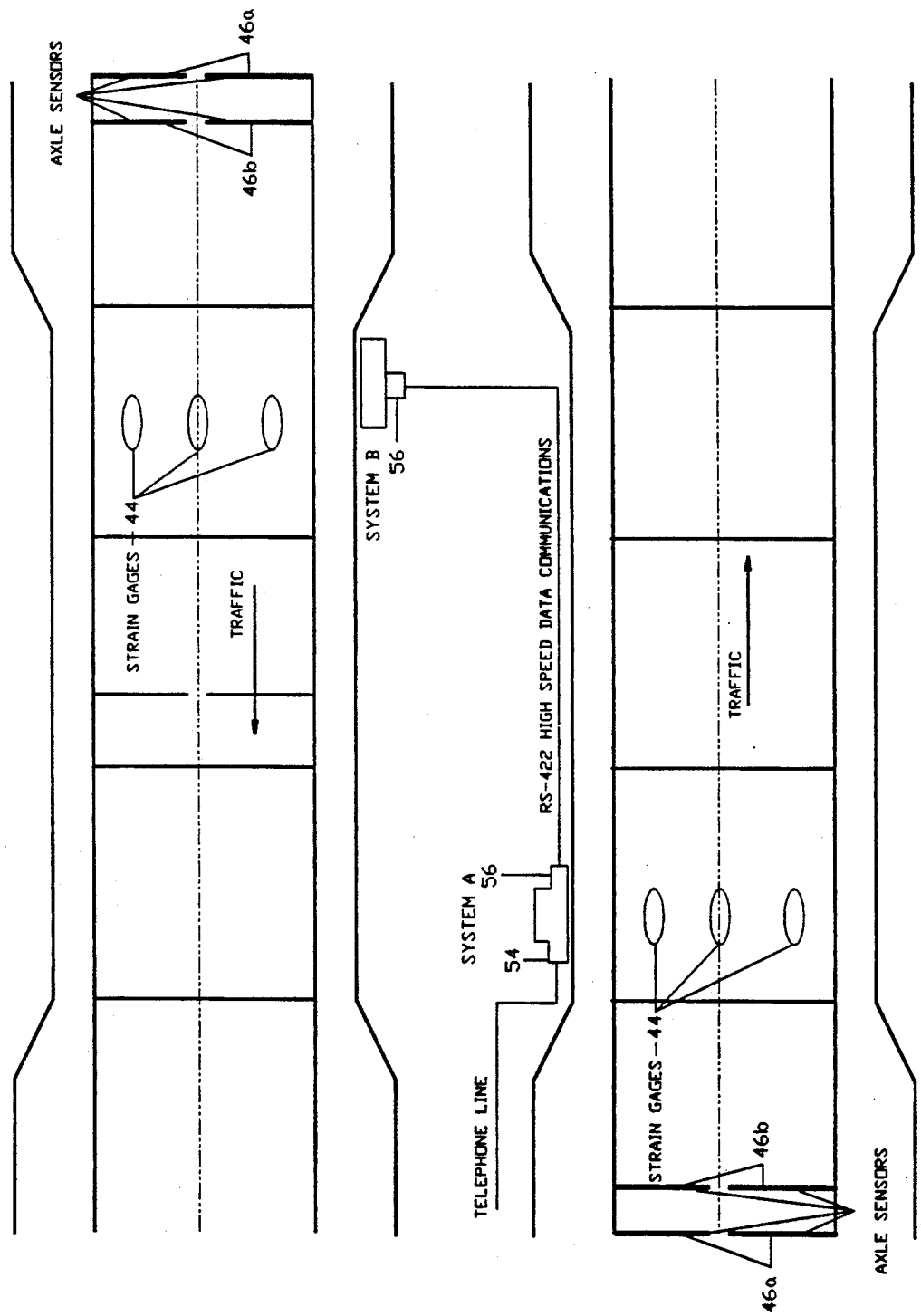
FIG. 7 is a diagram showing the set up of two weigh-in-motion systems to monitor bi-directional traffic.

A first axle sensor 46A and a second axle sensor 46B are installed within or placed on each lane of the pavement just before the bridge. (FIG. 7 illustrates the position of sensors 46A and 46B in a typical bridge weigh-in-motion dual system.) Each axle sensor can sense a vehicle axle passing thereover and output an axle sense signal 48 in response thereto. The axle sense signals are outputted in the form of either a digital pulse or a contact closure, and sent directly to the axle sensor input 58 on the CPU card 12. The CPU card includes a circuit which can detect the axle sensor signals 48 generated by the axle sensor 46.

The axle sensors 46 used in the apparatus may be of three types. The first choice, road hoses, can be installed quickly and easily, and are not likely to detach from the road in inclement weather. A vehicle axle passing over the road hose will cause a 0-5 VDC logic input line on the CPU axle sensor input 58 to change from a logic high level to a logic low level to indicate a passing axle. The second choice, tape switches, may be applied with either duct tape or an asphalt-based tape which can be preheated with a torch prior to application. The third choice, piezoelectric sensors, are permanently embedded into the pavement. Piezoelectric sensors, however, require an additional circuit board in the system to interface between the sensor and the CPU card. The interface circuit board converts a voltage pulse outputted by the piezoelectric sensor into a 0-5 VDC logic level that can be inputted into the CPU card.

One of the two axle sensors 46A and 46B is used to implement the power saving feature of the system. After a given vehicle's strain data has been collected and processed, the AFE card 14 completely powers down while the system is waiting for data to be provided by the next vehicle. This feature is beneficial due to the large power consumption of the apparatus' analog circuitry. The analog circuitry is operational only when strain data for a vehicle is being collected or processed so continuous enablement of the analog circuitry is a needless waste of power. The axle sense signal outputted by the first axle sensor 46A alerts the CPU card 12 of the next approaching vehicle to permit reactivation of the AFE card 14 and the strain gages 44. Within 30 milliseconds after the axle passes over the first axle sensor, the apparatus is ready to begin collecting strain data to be used in the weighing calculations. At this time the vehicle will not have reached the bridge. When the vehicle crosses the second axle sensor, another axle sense signal is generated. Both axle sense signals are then used by the CPU card to perform the speed and weight calculations.

The power supply 52 for the apparatus can be a battery, a solar cell, or some combination thereof. The choice of battery in the preferred embodiment is a gel cell battery which produces electricity by means of a chemical reaction. The reaction rate is dependent on temperature and has a direct effect on battery capacity. Due to the low power consumption of the system, photovoltaic panels (solar cells) are ideally suited to recharge the battery at a fixed continuous operation site. The solar panel and battery are sized for the weather patterns likely to affect a given location. Without recharging, a typical 12-volt lead acid gel cell battery will power the apparatus for more than fourteen (14) days at temperatures common during the summer months. At a continuous temperature of −4° F. (−20° C.) the apparatus will operate for more than six (6) days on a single battery charge.

Figure 3:
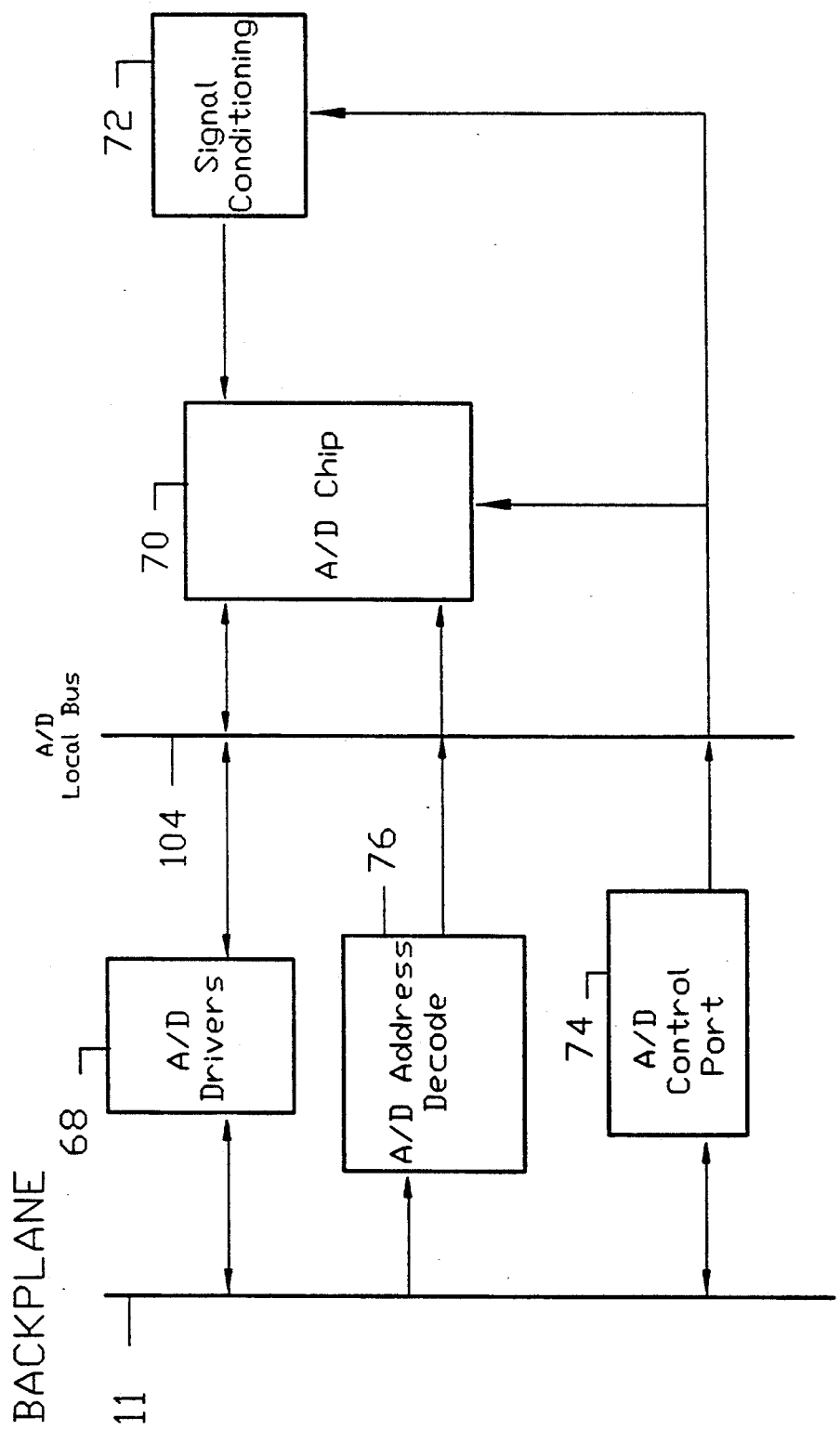
FIG. 3 is a functional block diagram of the analog front end circuit card of the system.

FIG. 3 is a functional block diagram of the AFE card 14 of the apparatus 10. The AFE card provides individual signal conditioning means and amplification means for the strain data outputted by each of the strain gages. The rates at which the strain data from each of the strain gages is sampled, and the gains provided by the amplification means, are individually programmable for each of the strain gage outputs. An A/D local bus 104 allows components on the AFE card to communicate with each other. A/D drivers 68 comprise the bus drivers 32, 34 and 42 located on the AFE card and serve the function of internal circuitry protection described earlier.

An A/D address decode 76 is necessary when more than eight strain gages are used in the system. Because each AFE card can only accept up to eight analog strain signals, a system having more than eight strain gages would require additional AFE cards. The A/D address decode 76 permits the CPU card 12 to address each AFE card differently in order to properly perform the necessary weighing calculations.

An A/D control port performs three functions. First, the control port 74 allows the microprocessor of the CPU card to implement the power saving feature of the system. The microprocessor removes power from the strain gages 44, the A/D chip 70, and all analog circuitry on the AFE card whenever the apparatus is not collecting or processing vehicle strain data. Second, the port 74 allows the microprocessor to zero any offset in the zero strain reference of the strain gages. Offset is caused by expansion and contraction of the bridge or by reapplying power to the strain gages in between sequential weighing operations. Third, the port 74 permits the microprocessor to compensate for any variation in strain gage outputs due to physical variation in strain gage components to insure accurate weighing.

Figure 4:
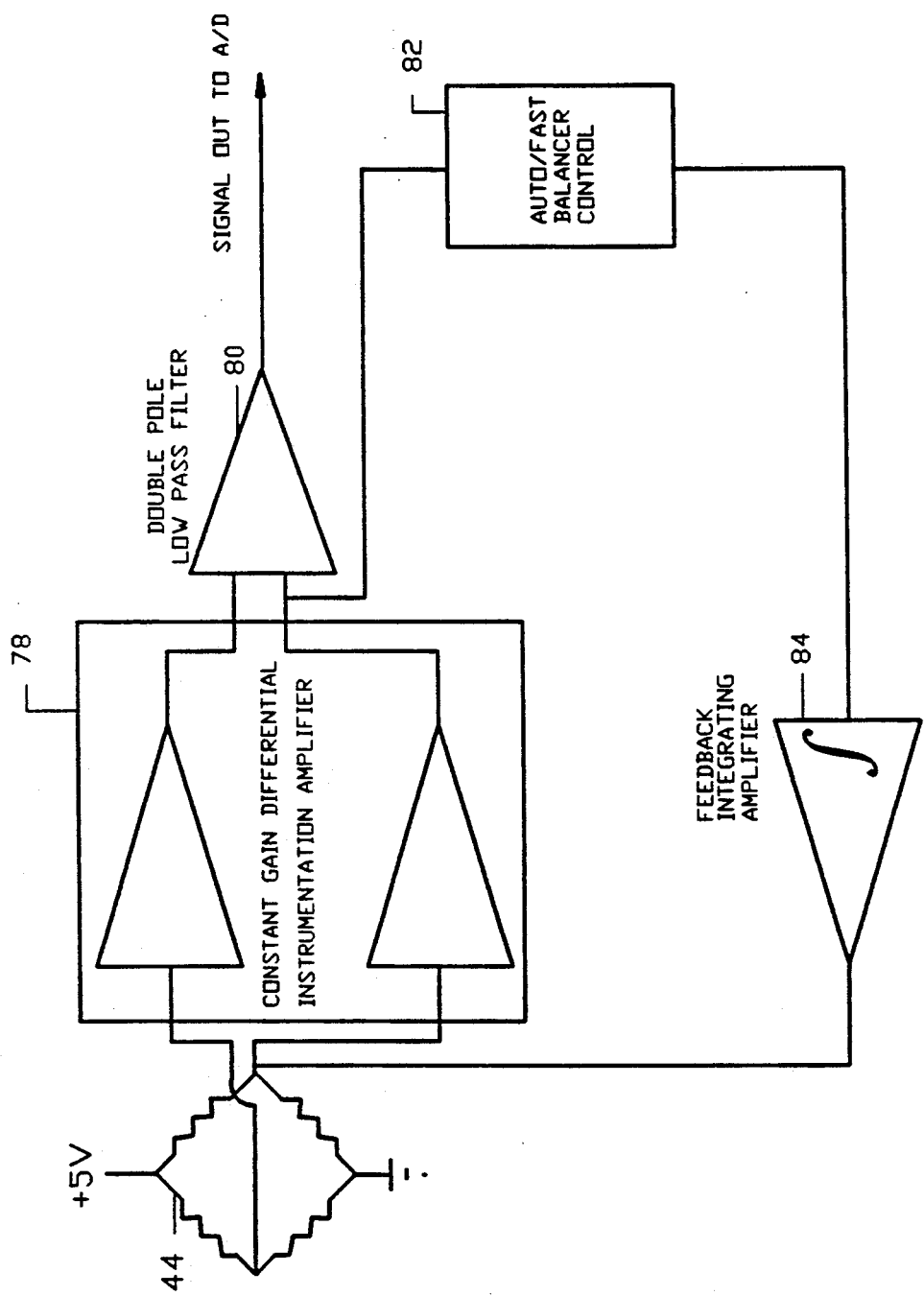
FIG. 4 is a functional block diagram of the signal conditioning portion of the analog front end circuit card.
Figure 5:
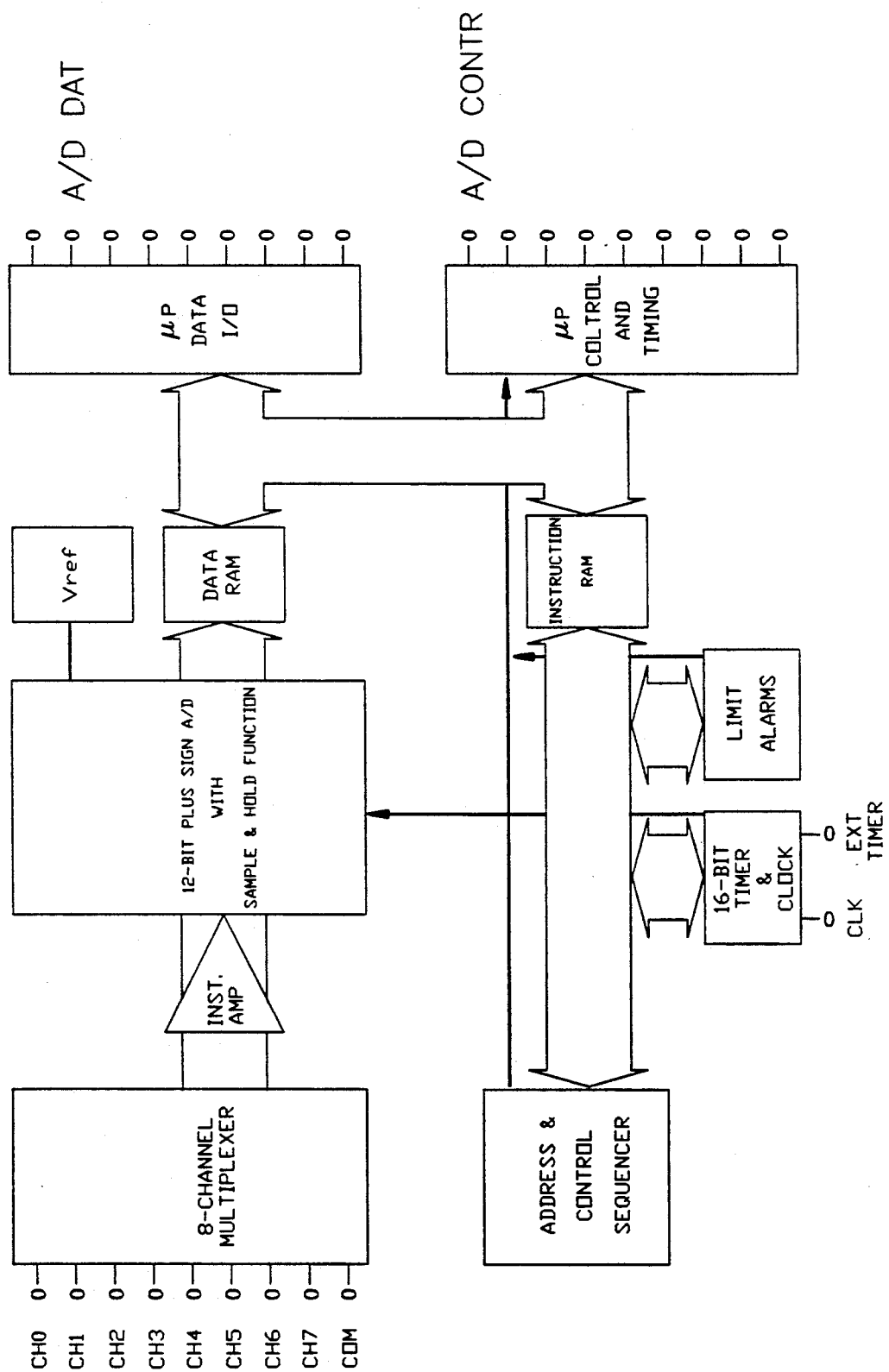
FIG. 5 is a functional block diagram of the analog to digital converter of the analog front end circuit card.

The signal conditioning circuitry 72 and the A/D chip 70 located on the AFE card 14 are shown in block diagram in FIGS. 4 and 5, respectively. Turning first to FIG. 4, a typical strain gage 44 is represented by a Wheatstone bridge. The analog strain signal is fed through a constant gain differential amplifier 78 and a double pole low pass filter 80 to amplify the analog strain gage signal. A feedback circuit comprising an auto/fast balancer controller 82 and a feedback integrating amplifier 84 conditions the amplified signal by zeroing any offset in the zero strain reference of the strain gage. FIGS. 4 and 5 represent all of the analog and digital circuitry on the AFE card which is powered down when the apparatus is not collecting or processing vehicle strain data.

FIG. 5 is a functional block diagram of the particular analog to digital converter chip used on the AFE card. A ML2208 converter chip is utilized, the makeup of which comprises no part of the present invention. Each ML2208 chip can handle up to eight amplified, conditioned analog strain signals provided by the signal conditioning circuitry 72 of FIG. 4. The output of the ML2208 chip is in digital format and can interface with the CPU card 12.

Figure 6:
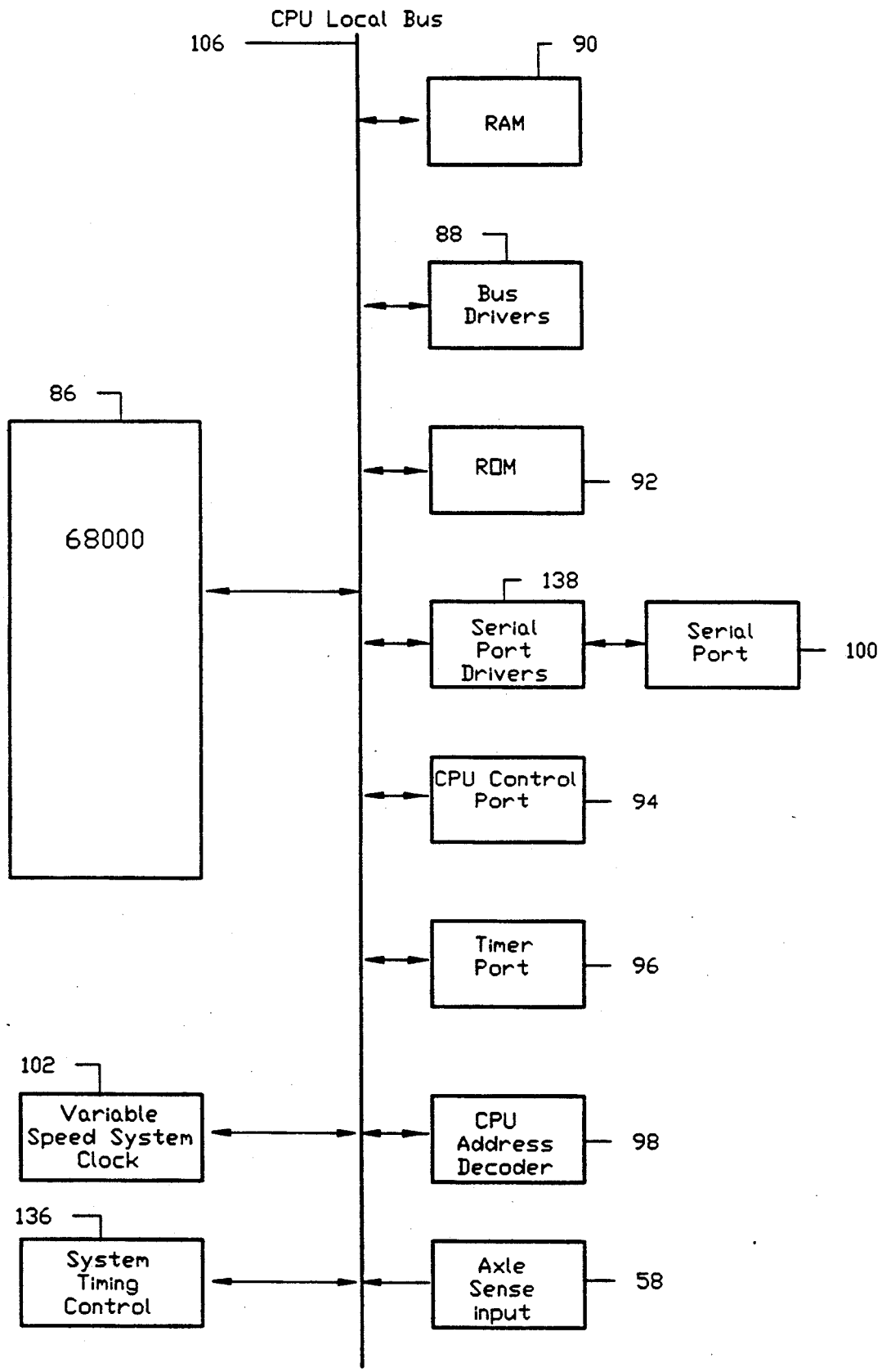
FIG. 6 is a functional block diagram of the central processing circuit card of the weigh-in-motion system.

FIG. 6 is a functional block diagram of the CPU card 12 of the apparatus. The CPU card utilizes a software driven microprocessor 86. The preferred embodiment uses a Motorola 68000 with 16-bit external/32-bit internal architecture, an asynchronous bus structure, and 16 megabytes of linear address space. The CPU card components communicate with each other over a CPU local bus 106. Bus drivers 88 represent the address bus driver 36, the data bus driver 38, the control bus driver 40, the AFE address bus driver 32, and the AFE data bus driver 34 located on the CPU card. The CPU card has up to 512K bytes of RAM 90 and 256K bytes of erasable-programmable read only memory (EPROM) 92. All of the system software is written into EPROM so there is no need to load the program from floppy disk or magnetic tape.

A CPU control port 94 implements a power saving feature on the CPU card similar to that implemented on the AFE card 14. A variable speed system clock 102 is used to control the frequency at which the microprocessor 86 operates and the rate of power consumption of the microprocessor. During the times when the microprocessor is receiving data input or performing calculations, the microprocessor operates at a rate of eight megahertz. When the microprocessor is not receiving data input or performing calculations, their rate of operation is reduced to four megahertz to save power.

A timer port 96 includes an internal clock which is used to keep time when the system is operating. System timing control 136 compensates for added propagation delay of signals on the CPU local bus 106 introduced by the bus drivers 88. A CPU address decoder 98 allows the microprocessor 86 to determine whether communications are occurring on the CPU card 12 or elsewhere in the system.

Serial port 100 includes an RS-422 port 54, which can be converted to an RS-232 port, and an RS-232 port 56. Port 56 uses the RS-232 protocol and can communicate at a programmable baud rate with a lap-top computer, a computer terminal, a modem, or with AVI (Automatic Vehicle Identification) equipment. The serial port 54 uses RS-422 protocol which is capable of transmitting data at a variable baud rate of up to 64K baud over a length of cable of up to 5000 feet. This port is used at a site where two or more bridges are to be instrumented for operation with two systems A and B as shown in FIG. 7. One phone line is brought to the site via third party modem and connected to system A at the RS-232 port 56. The RS-422 port 54 is used to connect system A to System B. In this manner, the output from System B can be transmitted through System A to the modem, thus saving on the installation of a second telephone line and an additional modem. If more than two systems are used at a given location, the RS-422 port 54 on each of the systems can be daisy chained to serially interconnect all of the systems.

The serial port 100 includes a serial integrated circuit chip which is powered down when the port 100 is not operating. This feature reduces the amount of power consumed by the CPU card whenever the serial port is not communicating data. Implementation of this feature requires the installation of serial port drivers 138.

Figure 8:
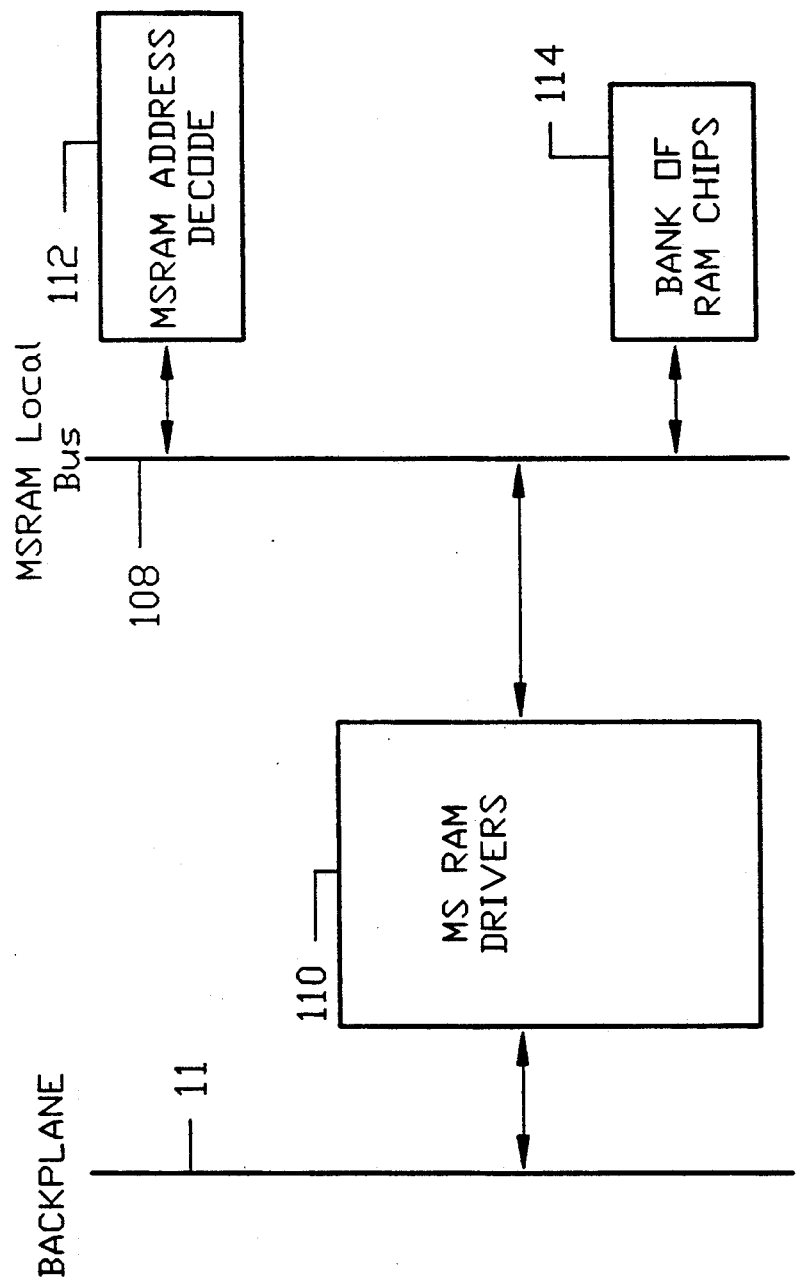
FIG. 8 is a functional block diagram of the random access memory circuit card of the system.

FIG. 8 is a functional bock diagram of the mass storage random access memory (MSRAM) card 18. The MSRAM components communicate over a MSRAM local bus 108. A bank of 32 RAM chips 114 populates the MSRAM card 18. The microprocessor can only address a pair of these 32 RAM chips at a time. An MSRAM address decode 112 determines which pair of RAM chips the microprocessor is communicating with at a given time. MSRAM drivers 110 represent the bus drivers 36, 38 and 40 previously discussed.

The apparatus can accommodate several MSRAM cards in order to retain more data. Each card has two lithium cell batteries on board to provide the power needed to retain the data for at least five years. This backup power is available immediately and automatically upon system power-down or removal of the MSRAM card from the back plane 11.

The apparatus as described facilitates ease of troubleshooting in the field by a technician. The two major cards in the system, the CPU and the AFE, are completely self-contained with on-board power supplies requiring only 12-volt power from the battery. Thus, an entire system can be repaired by merely replacing a faulty card. Each card can be easily removed from the back plane by loosening two screws.

The apparatus also facilitates ease of installation. The weigh-in-motion system can be installed in the portable mode in a matter of a few hours. Once the system is operational, no further operator attention is required until the apparatus or data therein is retrieved.

The invention also provides a method of acquiring vehicle speed, weight and classification data. The method comprises the steps of providing an axle sense signal generated by an axle sensor in response to a vehicle passing thereover, providing an analog strain signal generated by a strain gage attached to a bridge structure, converting the analog strain signal to digital format, determining the vehicle speed and axle spacings, relating the position of every axle on the bridge to the strain record of the bridge structure, and using a software driven microprocessor to calculate speeds and axle weights. The microprocessor uses a least squares error minimization technique in performing the necessary calculations. The least squares error minimization technique is described in "Weigh-in-Motion System Using Instrumented Bridges", Transportation Engineering Journal, ASCE, Vol. 105, May 1979. The vehicle speed, weight and classification data are then recorded for later retrieval.

The system software is written permanently into the CPU EPROM. The system uses a small, multi-tasking, real time operating system named pSOS which was written by Software Components Group of Santa Clara, Calif. The operating system has a low interrupt response time of 28 microseconds, and provides the overall organization for the system software as well as access to the system hardware.

Figure 9:
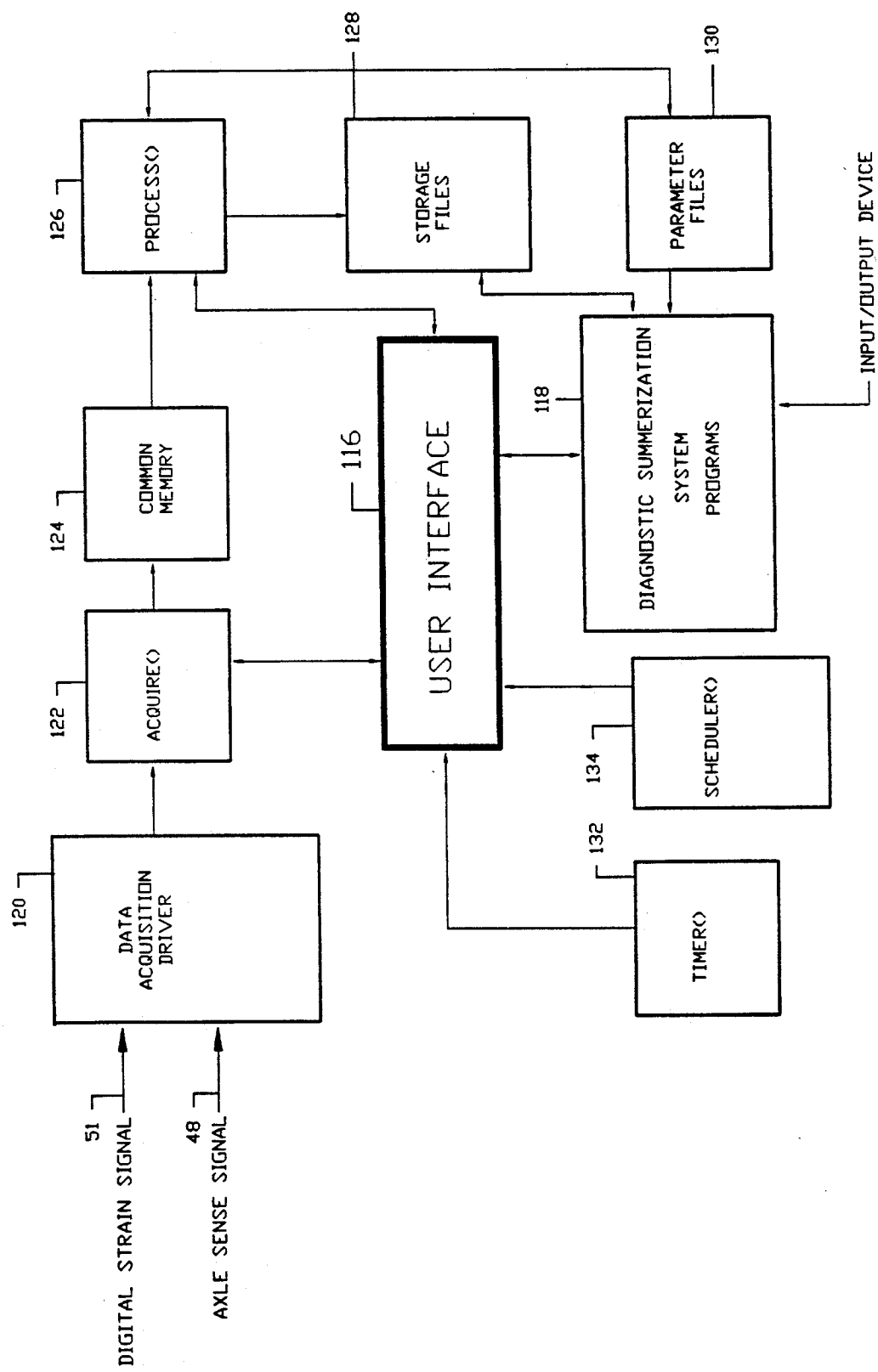
FIG. 9 is a functional block diagram of the system software.

FIG. 9 shows a functional block diagram of the system software. The main programs in the system software are an acquire program and a process program, which collect the input data and determine vehicle weights, respectively. The input data comprises the axle sense signals 48 outputted by the axle sensors and the digital strain signals 51 outputted by the AFE card.

As an axle sensor outputs an axle sense signal 48, a hardware interrupt is generated to permit a data acquisition driver 120 to respond. The data acquisition driver reads the data on the axle sensor input port 58 on the CPU card, time stamps this data, and makes this data available to the acquire program 122. The data acquisition driver 120 also senses an interrupt generated by the digital strain signals outputted by the AFE card. The data acquisition driver reads this strain data and passes it on to the acquire program 122.

The acquire program 122 uses the axle sense signals 48 to determine when a vehicle first begins crossing the bridge, when it has left the bridge, and the total time elapsed while the vehicle was on the bridge. Based on these determinations, the acquire program calculates the speed of the vehicle. The acquire program 122 simultaneously matches the axle sense signal data with the digital strain signal data and passes this information, along with the vehicle speed determination, to a common memory 124. The common memory permits the acquire program 122 to continuously acquire input data. The process program 126 uses the data contained in the common memory 124 to determine the portion of the vehicle weight carried by each individual vehicle axle. The process program can then calculate the gross vehicle weight by summing these individual axle weights. This information is passed on to storage files 128 located on the MSRAM card 18.

A user interface 116 maintains control of the system programs and allows an operator to interact with the system. In addition to the acquire and process programs, the system programs include diagnostic and summarization programs 118. These programs allow the operator to diagnose the system or collect and summarize data by means of the input/output device 62. The system can continue weighing operations while data is being collected and summarized. Data accessible by the input/output device is outputted in FHWA Card 7 format, as described in Federal Highway Administration publications.

A scheduler 134 permits the operator to program a time at which the diagnostic or summarization programs 118 are executed. For example, the summarization program can be set to execute each night at midnight to summarize the weighing operations that have occurred during the previous 24-hour period. The scheduler 134 thus provides a convenient means whereby data can be collected and summarized while the system is operating unattended.

Parameter files 130 are used during the operation of both the acquire program 122 and the process program 126. Data contained within the parameter files includes the number of strain gager used, the location of the axle sensors, the length of the bridge, and a calibration factor. The calibration factor is obtained by scaling the output of the system to match the known weight of a test vehicle passing over the bridge. A timer 132 is used to monitor the date and time of day.

Accordingly, the preferred embodiment of an apparatus and a method for weighing a vehicle in motion has been described. However, with the present disclosure in mind, it is believed that obvious alternatives to the preferred embodiment, to achieve comparable advantages in other weigh-in-motion systems, will become apparent to those of ordinary skill in the art.

What we claim is:

1. A self-operating apparatus for weighing a moving vehicle, comprising:
   a plurality of strain gauges adapted to be attached to existing bridge structures, each of said strain gauges adapted to sense strain sustained by said bridge structure when a vehicle passes thereover, and outputting an analog strain signal in response to said strain;
   at least one pair of axle sensors, each of said axle sensors adapted to automatically sense a vehicle axle passing thereover and output an axle sense signal in response thereto;
   means for converting said analog strain signal to a digital strain signal;
   central processing circuitry adapted to (i) perform first computations on said axle sense signal to determine vehicle speed and vehicle axle spacing, and (ii) perform second computations on said digital strain signal and said axle sense signal to determine vehicle weight, said central processing circuitry further adapted to output results of said first and second computations;
   random access memory circuitry directly accessible by a digital computer and adapted to receive and retain said results of said first and second computations;
   means to supply power to said strain gauges, said axle sensors, said signal converting means, said central processing circuitry, and said random access memory circuitry; and
   electrical interconnection means for electronically interconnecting said means to supply power, said strain gauges, said axle sensors, said signal converting means, said central processing circuitry and said random access memory circuitry.

2. The apparatus of claim 1, wherein:
   said central processing circuitry includes at least 384K bytes of random access memory capability and at least 128K bytes of erasable-programmable read only memory capability;
   said random access memory circuitry includes at least one megabyte of static random access memory capability; and
   said electrical power supply means comprises a portable direct current battery.

3. The apparatus of claim 1, wherein said axle sensors comprise a pair of tape switches each adapted to output a contact closure to said central processing circuitry.

4. The apparatus of claim 3, wherein said central processing circuitry includes a serial communications port operating under RS-232 protocol at a rate of 9600 baud.

5. The apparatus of claim 3, further comprising electrical interconnection means for electronically interconnecting said power supply means, said strain gages, said axle sensors, said signal converting means, said central processing circuitry and said random access memory circuitry.

6. A self-operating apparatus for weighting a moving vehicle, comprising:
- a plurality of strain gauges adapted to be attached to existing bridge structures, each of said strain gauges adapted to sense the strain sustained by said bridge structure when a vehicle passes thereover, and outputting an analog strain signal in response to said strain;
- at least one pair of axle sensors, each of said axle sensors in said pair of axle sensors being positioned with a predetermined distance between each axle sensor in said pair of axle sensors and being adapted to automatically sense a vehicle axle passing thereover and output axle sense signals in response thereto;
- analog front end circuitry adapted to receive and amplify a plurality of analog strain signals, convert said analog strain signals to digital strain signals, using conversion means, and output said digital strain signals;
- central processing circuitry adapted to receive said digital strain signals and said axle sense signals, perform first computations on said axle sense signals to determine vehicle speed and vehicle axle spacing, perform second computations on said digital strain signals and said axle sense signals to determine vehicle weight, and output results of said first and second computations;
- random access memory circuitry adapted to receive and retain said results of said first and second computations, said random access memory circuitry directly accessible by a digital computer;
- an electrical power supply adapted to supply power to said strain gages, said axle sensors, said analog front end circuitry, said central processing circuitry, and said random access memory circuitry; and
- electrical interconnection means adapted to electrically interconnect said electrical power supply, said strain gauges, said axle sensors, said analog front end circuitry, said central processing circuitry, and said random access memory circuitry.

7. The apparatus of claim 6, wherein each of said analog front end circuitry, said central processing circuitry, and said random access memory circuitry comprises at least one circuit card, and wherein said electrical interconnection means includes a plurality of connectors into which said circuit cards are removably insertable in any order.

8. The apparatus of claim 7, wherein:
- said central processing circuit card provides a microprocessor, communication means to receive data from or send data to a data input/output device, and read only memory adapted to receive and retain software instructions written therein, said microprocessor adapted to respond to said software instructions; and
- said random access memory circuit card includes a source of backup power comprising at least one battery, said battery adapted to provide electrical power to said random access memory circuit card upon removal of said power supply from said memory circuit card to preserve data contained therein.

9. The apparatus of claim 8, adapted to further comprise a modem card receivable by one of said plurality of connectors, said modem card adapted to output data contained within said random access memory circuit card by means of an ordinary telephone line.

10. The apparatus of claim 8, wherein said electrical interconnection means further comprises a bus over which said circuit cards can communicate data with one another, and a plurality of bus driver integrated circuit chips disposed electrically between said bus and said circuit cards.

11. The apparatus of claim 8, wherein:
- said central processing circuit card is adapted to operate at a lower frequency and a lower rate of power consumption whenever said central processing circuit card is not receiving said digital strain signals or said axle sense signals or not performing said computations thereon;
- said first communication means and said second communications means are deactivated when not receiving or sending said data; and
- said conversion means of said analog front end circuit card are deactivated when not receiving, converting or outputting said strain signals.

12. The apparatus of claim 1 wherein said electrical power supply includes a portable direct current battery.

13. The apparatus of claim 11, wherein said electrical power supply comprises either or both a battery and a photovoltaic cell, said battery adapted to provide electrical power to said apparatus, said photovoltaic cell adapted to recharge said battery during operation of said apparatus.

14. The apparatus of claim 13 wherein said pair of axle sensors comprise a pair of road hoses adapted to output said axle sense signals to said central processing circuit card in the form of low voltage digital logic signals.

15. The apparatus of claim 13, wherein said pair of axle sensors comprise a pair of piezoelectric cables adapted to output said axle sense signals to said central processing circuit card in the form of low voltage digital logic signals.

16. The apparatus of claim 13, wherein said pair of axle sensors comprise a pair of tape switches adapted to output said axle sense signals to said central processing circuit card in the form of contact closures.

17. The apparatus of claim 13, wherein said random access memory circuit card includes at least four megabytes of static random access memory capability.

18. The apparatus of claim 13, wherein said central processing circuit card includes at least 512K bytes of random access memory capability and at least 256K bytes of said read only memory.

19. The apparatus of claim 13, wherein said communication means operates at a variable baud rate.

20. The apparatus of claim 13, wherein said apparatus is manually portable.

21. The apparatus of claim 13, wherein said strain gages, said axle sensors, said analog front end circuit card, said central processing circuit card, said random access memory circuit card, and said power supply are designed to be operated within the temperature range of −40° C. to 70° C. (−40° F. to +158° F.).

22. The apparatus of claim 13, further comprising an enclosure adapted to contain said central processing circuit card, said random access memory circuit card, said analog front end circuit card and said electrical interconnection means.

23. A method of weighing a vehicle in motion using a digital computer controlled by a microprocessor operating at a clock rate, comprising the steps of:

attaching at least one strain gage to an existing bridge structure spanning two sections of roadway, said strain gauge adapted to sense strain sustained by said structure when a vehicle passes thereover and output a strain signal in response thereto;

placing at least one pair of axle sensors on or in one of said two sections of roadway before said bridge, each axle sensor in said pair of axles sensors being positioned with a predetermined distance between each axle sensor in said pair of axle sensors, and being adapted to automatically sense a vehicle axle passing thereover and output an axle sense signal in response thereto;

providing said microprocessor with data including said predetermined distance between axle sensors, said axle sense signal and said strain signal;

performing first calculations with he microprocessor using said axle sense signal and said predetermined distance between axle sensors to determine a vehicle velocity and vehicle axle spacings and output first results of said first calculations;

storing said first results in a semiconductor memory device which is directly accessible by a digital computer;

performing second calculations with the microprocessor using said strain signal and said axle sense signal to relate a position of very vehicle axle on the bridge to said strain signal and thereby determine an individual weight carried by each individual axle of said vehicle and output second results of said second calculations;

determining a gross vehicle weight by summing said individual weights; and storing said second results and said gross vehicle weight in said semiconductor memory device.

24. The method of weighing of claim 23, further comprising the steps of:

applying power to activate said amplification means and said conversion means in response to said axle sense signal;

removing power to deactivate said amplification means and said conversion means after said analog strain signal has been amplified and converted to said digital strain signal; and reducing said clock rate of said microprocessor when said microprocessor is not provided with said axle sense signal or said analog strain signal or when said microprocessor is not performing said first calculations or said second calculations.

25. The method of weighing of claim 23, further comprising the steps of providing amplification means for amplifying said strain signal and providing conversion means for converting said strain signal from an analog to a digital format prior to providing said microprocessor with said strain signal.

26. The method weighing of claim 23 where said second calculations are carried out using a least squares error minimization technique.

* * * * *